«12» United States Patent
Isoguchi et al.

«10» Patent No.: US 8,976,376 B2
«45» Date of Patent: Mar. 10, 2015

«54» PRINTING CONTROL APPARATUS, PRINTING SYSTEM, RECORDING MEDIUM HAVING RECORDED THEREON PRINTING CONTROL PROGRAM, AND PRINTING CONTROL METHOD

«71» Applicant: Dainippon Screen Mfg. Co., Ltd., Kyoto (JP)

«72» Inventors: Kazuo Isoguchi, Kyoto (JP); Kenta Nagai, Kyoto (JP); Rui Yamaguchi, Kyoto (JP)

«73» Assignee: SCREEN Holdings Co., Ltd. (JP)

«*» Notice: Subject to any disclaimer, the term of this patent is extended or adjusted under 35 U.S.C. 154(b) by 33 days.

«21» Appl. No.: 13/781,956

«22» Filed: Mar. 1, 2013

«65» Prior Publication Data

US 2013/0258378 A1 Oct. 3, 2013

«30» Foreign Application Priority Data

Mar. 29, 2012 (JP) ................................. 2012-075808

«51» Int. Cl.
*G06K 15/02* (2006.01)
*G06F 3/12* (2006.01)
*G06F 15/80* (2006.01)

«52» U.S. Cl.
CPC ........ *G06K 15/1813* (2013.01); *G06K 15/1857* (2013.01); *G06K 15/1888* (2013.01); *G06F 3/1213* (2013.01); *G06F 3/1243* (2013.01); *G06F 3/1247* (2013.01); *G06F 3/1285* (2013.01)

USPC ....... 358/1.13; 358/1.15; 358/1.16; 358/1.17; 358/1.18; 358/501; 358/540; 358/401

«58» Field of Classification Search
None
See application file for complete search history.

«56» References Cited

U.S. PATENT DOCUMENTS

| 8,094,327 B2* | 1/2012 | Ogasawara ................. 358/1.14 |
| 2004/0095596 A1 | 5/2004 | Rijavec ....................... 358/1.15 |
| 2004/0169880 A1* | 9/2004 | Nakanishi et al. ............ 358/1.15 |
| 2005/0094191 A1* | 5/2005 | Vondran et al. .............. 358/1.15 |
| 2007/0097416 A1* | 5/2007 | Higashimura et al. ....... 358/1.15 |
| 2010/0296118 A1* | 11/2010 | Nakao et al. ................ 358/1.15 |
| 2012/0188590 A1* | 7/2012 | Klassen et al. .............. 358/1.15 |

FOREIGN PATENT DOCUMENTS

| JP | 2002-287934 | 10/2002 |
| JP | 2004192390 A * | 7/2004 |
| JP | 2006-039719 | 2/2006 |
| JP | 2009-071352 | 4/2009 |
| JP | 2011-067993 | 4/2011 |

* cited by examiner

Primary Examiner — Beniyam Menberu
«74» Attorney, Agent, or Firm — Ostrolenk Faber LLP

«57» ABSTRACT

A first RIP processing unit reads cache data from a first cache unit. The first RIP processing unit transmits first RIP-processed variable part data to a printer. Since an identifier read by the first RIP processing unit is not a transmitted identifier, the first RIP processing unit transmits RIP-processed reuse part data to the printer. A second RIP processing unit reads cache data from a second cache unit. The second RIP processing unit transmits second RIP-processed variable part data to the printer. Since an identifier read by the second RIP processing unit is a transmitted identifier, the second RIP processing unit does not transmit the RIP-processed reuse part data to the printer.

14 Claims, 15 Drawing Sheets

PRINTING CONTROL APPARATUS, PRINTING SYSTEM, RECORDING MEDIUM HAVING RECORDED THEREON PRINTING CONTROL PROGRAM, AND PRINTING CONTROL METHOD

BACKGROUND OF THE INVENTION

1. Field of the Invention

The present invention relates to a printing control apparatus and, more particularly, to a printing control apparatus, a printing system, a recording medium having recorded thereon a printing control program, and a printing control method performing a rasterizing process.

2. Description of Background Art

A printing system is generally made up of a printing control apparatus and a printer. The printing control apparatus receives manuscript data from an external Personal Computer (PC). The manuscript data is data generated by editing parts to be used in each page and laying them out, and described in Page Description Language (PDL). The printing control apparatus performs a rasterizing process (hereinafter, described as an "RIP process") by an Raster Image Processor (RIP) on the received manuscript data to generate printing output data. The printing output data includes data obtained by the RIP process (hereinafter, called "RIP-processed data"), and synthesis information used for synthesizing the RIP-processed data in the printer. The printing output data is transmitted to the printer. The printer outputs a printed matter based on the received printing output data. In the printing industry, to achieve reduction in print cost, an increase in speed of processes performed by a printing system (hereinafter, called a "printing process") as described above is in demand.

Japanese Patent Application Laid-Open Publication No. 2011-67993 discloses an image processing apparatus performing the RIP process by a plurality of RIP processing units in parallel. The image processing apparatus corresponds to the above-described printing control apparatus. Hereinafter, the RIP process performed in parallel will be called a "parallel RIP process". By such a parallel RIP process, the speed of the RIP process can be increased. To the plurality of RIP processing units, a cache memory is connected. In the cache memory, RIP-processed data obtained by the RIP process in the RIP processing units is cached. Consequently, with respect to a reuse part as a part which is repeatedly used in a plurality of pages, its RIP-processed data is cached for the first time, and the cached RIP-processed data is used for the second time on. In such a manner, the speed of the RIP process can be further increased. RIP-processed data of each part is transmitted to a printer for each page in which the part is used. The parallel RIP process is disclosed also in United States Patent Application Publication No. 2004/95596 and Japanese Patent Application Laid-Open Publication No. 2006-39719. The RIP process using a cache is disclosed also in Japanese Patent Application Laid-Open Publication No. 2009-71352.

In the technique disclosed in Japanese Patent Application Laid-Open Publication No. 2011-67993 and the like, however, even RIP-processed data corresponding to a reuse part is transmitted from a printing control apparatus to a printer for each page used. Consequently, in the case where a reuse part exists, although the speed of the RIP process can be increased, the speed of the entire printing process cannot be sufficiently increased.

SUMMARY OF THE INVENTION

An object of the present invention is to provide a printing control apparatus, a printing system, a recording medium having recorded thereon a printing control program, and a printing control method realizing higher speed of entire printing process.

To achieve the above-described object, the present invention has the following features.

One aspect of the present invention relates to a printing control apparatus for obtaining output data in a print output form from manuscript data expressed in a page description language and made up of a plurality of pages, and transmitting the output data to an external printer, the apparatus comprising:

an output processing unit for converting the manuscript data assigned to the output data and transmitting the output data to the printer; and a first storage unit for storing at least a reuse part obtained by converting reuse part data indicative of a part reused in the manuscript data and an identifier corresponding to the reuse part, in the output data, wherein the output processing unit reads a reuse part to be transmitted to the printer and an identifier corresponding to the reuse part from the first storage unit, and omits transmission of a reuse part corresponding to the same identifier as that corresponding to the reuse part already transmitted to the printer.

With such a configuration, in a printing control apparatus in which at least a reuse part in output data is stored in a first storage unit, an identifier corresponding to a reuse part is stored in the first storage unit. Transmission of a reuse part corresponding to the same identifier as that corresponding to a reuse part already transmitted to the printer in the reuse part read from the first storing unit is omitted. Consequently, the speed of the output data transmitting process becomes higher. Accordingly, the speed of the entire printing process can be made higher.

In such an apparatus, preferably, one or more output processing units are further provided.

With such a configuration, by using a plurality of output processing units, the speed of the process of converting the manuscript data to output data can be increased. Consequently, the speed of the entire printing process can be further increased.

Preferably, the apparatus further includes a reuse information obtaining unit for obtaining information regarding reuse of a part in the manuscript data.

With such a configuration, whether each part in manuscript data is a reused part or not is known from reuse information. For example, using the reuse information, an identifier can be assigned to a reuse part in output data.

In such an apparatus, preferably, the manuscript data includes information regarding reuse of apart in the manuscript data.

Also with such a configuration, by reuse information, whether each part in manuscript data is a reused part or not can be known. For example, using the reuse information, an identifier can be assigned to a reuse part in output data.

In such an apparatus, preferably, each of the output processing units assigns the identifier to the reuse part based on the information regarding reuse of a part in the manuscript data.

With such a configuration, in each output unit, using the reuse information, an identifier can be assigned to a reuse part in output data.

Preferably, the apparatus further includes an output control unit for obtaining an identifier read from the first storage unit by each output processing unit from the output processing unit and, when the identifier is an identifier corresponding to a reuse part already transmitted to the printer, controlling an output processing unit having obtained the identifier so as not to transmit the reuse part corresponding to the identifier to the printer.

With such a configuration, by determining whether an identifier read by an output processing unit is an identifier corresponding to a reuse part already transmitted to the printer or not by the output control unit, an advantage similar to the above-described configuration can be obtained.

In such an apparatus, preferably, the output processing units are configured to mutually refer to identifiers read from the first storage unit, and each output processing unit determines whether or not the identifier read from the first storage unit is an identifier corresponding to a reuse part already transmitted to the printer.

With such a configuration, by determining whether or not an identifier read from an output processing unit is an identifier corresponding to a reuse part already transmitted to the printer by an output processing unit, an advantage similar to that of the above-described configuration can be obtained.

In such an apparatus, preferably, the first storage unit also stores a part of the output data, the part being obtained by converting part data indicative of a part used only once in the manuscript data.

With such a configuration, a part obtained by converting part data indicative of apart used only once in manuscript data, in output data is also stored in the first storing unit. Consequently, in the case where output data has to retransmitted to the printer such as the case where, for example, deficiency, disappearance, or the like of output data occurs in the printer, it is sufficient to retransmit output data stored in the second storing unit so that a process of converting manuscript data to output data does not have to be performed again. Thus, the speed of the entire printing process in the case where retransmission of output data is necessary can be increased.

Another aspect of the present invention relates to a printing system having a printing control apparatus according to the above aspect of the invention, and the printer.

In such an apparatus, preferably, the printer includes:

a second storage unit for storing output data received from each of output processing units; and a printing unit for reading the output data stored in the second storage unit and executing printing.

With such a configuration, a reuse part of output data transmitted only once is stored in the second storing unit, so that the reuse part can be certainly reused in the printer.

In such an apparatus, preferably, the printing control apparatus transmits synthesis information regarding synthesis of each of parts of the output data in each page to the printing unit, and the printing unit synthesizes the parts of the output data stored in the second storage unit page by page based on the received synthesis information.

With such a configuration, by synthesizing parts of output data page by page using synthesis information, a printed matter expressing a synthesis state of the parts of the output data can be output.

Still another aspect of the present invention relates to a computer-readable recording medium having recorded thereon a printing control program, when executed using a memory by a CPU of a computer for obtaining output data in a print output form from manuscript data expressed in a page description language and made up of a plurality of pages and transmitting the output data to an external printer, causing the CPU to perform:

an output processing step of converting the manuscript data assigned to the output data and transmitting the output data to the printer; and a storage step of storing at least a reuse part obtained by converting reuse part data indicative of a part reused in the manuscript data and an identifier corresponding to the reuse part in the output data into a storage unit, wherein in the output processing step, a reuse part to be transmitted to the printer and an identifier corresponding to the reuse part are read from the storage unit, and transmission of a reuse part corresponding to the same identifier as that corresponding to a reuse part already transmitted to the printer is omitted.

In such a recording medium, preferably, the printing control program causes the CPU to further perform one or more output processing steps.

In such a recording medium, preferably, the printing control program causes the CPU to further perform a reuse information obtaining step of obtaining information regarding reuse of a part in the manuscript data.

In such a recording medium, preferably, the manuscript data includes information regarding reuse of a part in the manuscript data.

In such a recording medium, preferably, in each of the output processing steps, the identifier is assigned to the reuse part based on information regarding reuse of a part in the manuscript data.

In such a recording medium, preferably, the printing control program causes the CPU to further perform an output control step of obtaining an identifier read from the storage unit in an output processing step and, when the identifier is an identifier corresponding to a reuse part already transmitted to the printer, controlling the output processing step so as not to transmit the reuse part corresponding to the identifier to the printer.

In such a recording medium, preferably, the output processing steps are configured to mutually refer to identifiers read from the storage unit, and in each output processing step, whether or not the identifier read from the storage unit is an identifier corresponding to a reuse part already transmitted to the printer is determined.

In such a recording medium, preferably, in the storage step, a part of the output data is also stored, the part being obtained by converting part data indicative of a part that is used only once in the manuscript data.

Yet another aspect of the present invention relates to a printing control method of obtaining output data in a print output form from manuscript data expressed in a page description language and made up of a plurality of pages and transmitting the output data to an external printer, the method comprising:

an output processing step of converting the manuscript data assigned to the output data and transmitting the output data to the printer; and a storage step of storing at least a reuse part obtained by converting reuse part data indicative of a part reused in the manuscript data and an identifier corresponding to the reuse part in the output data into a storage unit, wherein in the output processing step, a reuse part to be transmitted to the printer and an identifier corresponding to the reuse part are read from the storage unit, and transmission of a reuse part corresponding to the same identifier as that corresponding to a reuse part already transmitted to the printer is omitted.

These and other objects, features, aspects and advantages of the present invention will become more apparent from the following detailed description of the present invention when taken in conjunction with the accompanying drawings.

DESCRIPTION OF PREFERRED EMBODIMENTS

<1. Overall Configuration>

Figure 1:
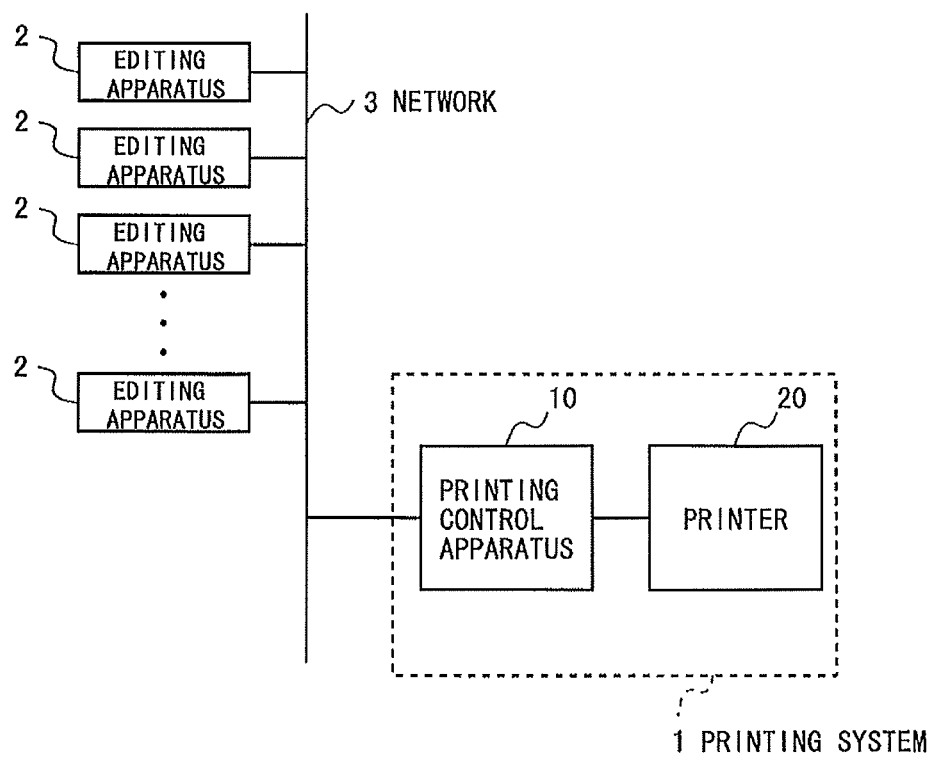
FIG. 1 is a block diagram illustrating an overall configuration of a printing system according to an embodiment of the present invention and apparatuses related to the system.

FIG. 1 is a block diagram illustrating an overall configuration of a printing system according to an embodiment of the present invention and apparatuses related to the system. The printing system 1 according to the embodiment performs variable printing as a mode of on-demand printing. In the variable printing, a printed matter which varies by a record unit including one or more pages is output. That is, manuscript data received by a printing control apparatus in the variable printing (hereinafter, called "variable manuscript data") is made up of a plurality of records. For example, one record corresponds to a printed matter (such as a record, an invoice, or a direct mail) related to one customer. In such variable printing, a part or all of parts used may vary among pages. On the other hand, reuse parts can be used among pages.

The printing system 1 has a printing control apparatus 10 and a printer 20. The printing control apparatus 10 and the printer 20 are connected to each other via a communication line. To the printing control apparatus 10, a plurality of editing apparatuses 2 are connected via a network 3. The network 3 may be the Internet or an Local Area Network (LAN). The printing control apparatus 10 and the editing apparatus 2 may be connected to each other not necessarily by the network 3 but by a communication line or the like.

The editing apparatus 2 is typically a PC. The editing apparatus 2 is used for generating variable manuscript data. The variable manuscript data is generated by editing parts to be used in each page and laying them out. The editing process is performed by using, for example, Desk Top Publishing (DTP) software. The variable manuscript data is data described in the PDL. As the PDL, for example, PostScript (a registered trademark of Adobe Systems Incorporated) is used. The variable manuscript data generated by each of the editing apparatuses 2 is transmitted to the printing control apparatus 10 via the network 3. Although the plurality of editing apparatuses 2 are connected to the network 3 in FIG. 1, the number of editing apparatuses 2 may be one.

The printing control apparatus 10 performs the RIP process and the like on the variable manuscript data received via the network 3 to generate printing output data. The printing output data includes RIP-processed data as output data and synthesis information used for synthesizing the RIP-processed data. The variable manuscript data to be processed in the printing control apparatus 10 is obtained by integrating variable manuscript data transmitted from the plurality of editing apparatuses 2. The printing output data generated by the printing control apparatus 10 is transmitted to the printer 20 via the communication line.

The printer 20 outputs a printed matter based on the printing output data received via the communication line. The printer 20 is, for example, an ink jet printer. Although one printer 20 is connected to the printing control apparatus 10 in FIG. 1, the present invention is not limited to the configuration. A plurality of printers 20 may be connected to the printing control apparatus 10.

<2. Configuration of Printing Control Apparatus>

Figure 2:
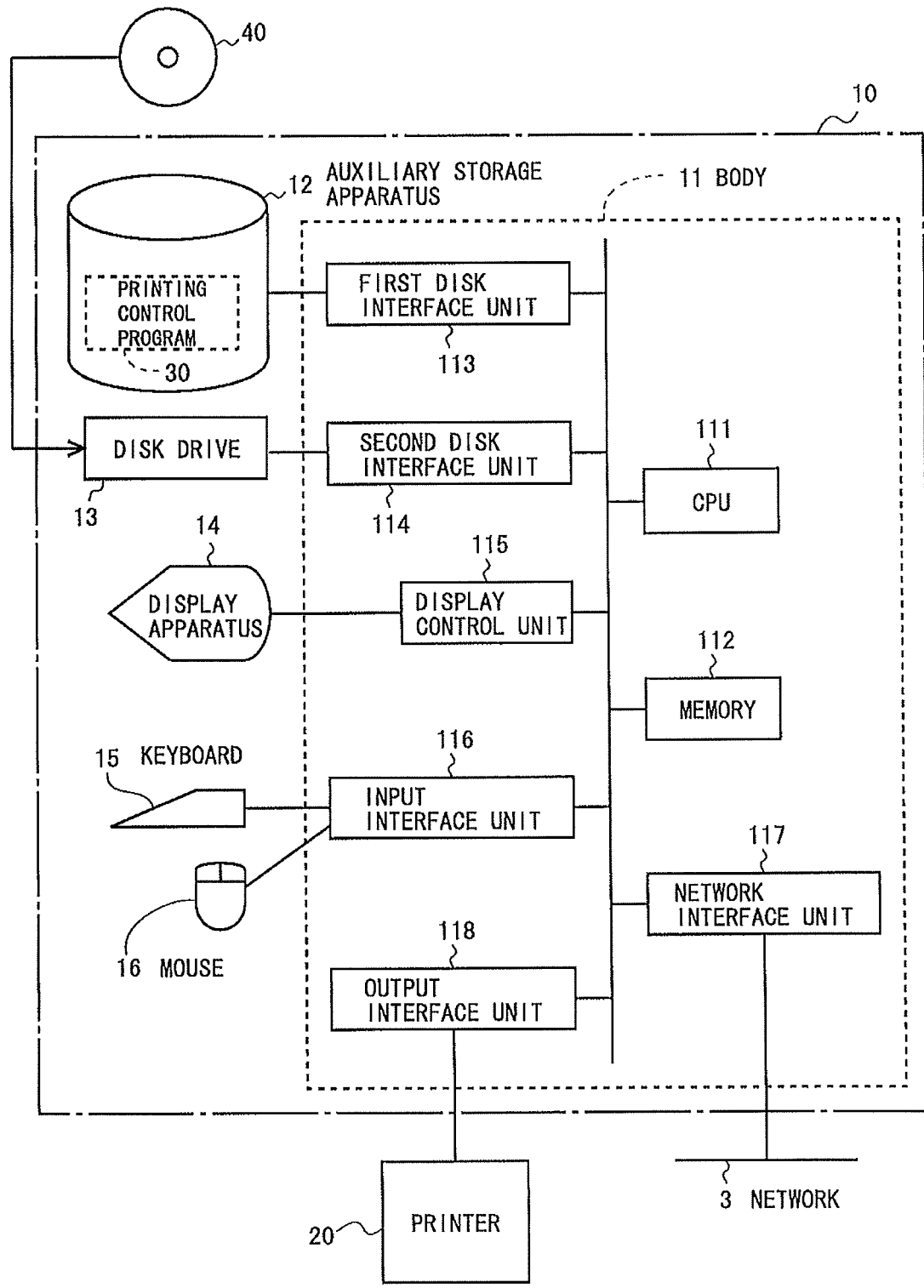
FIG. 2 is a diagram illustrating a hardware configuration of a printing control apparatus in the embodiment.

FIG. 2 is a diagram illustrating a hardware configuration of the printing control apparatus 10 in the embodiment. As illustrated in FIG. 2, the printing control apparatus 10 has a body 11, an auxiliary storage apparatus 12, a disk drive 13, a display apparatus 14, a keyboard 15, a mouse 16, and the like. The body 11 includes a CPU 111, a memory 112, a first disk interface unit 113, a second disk interface unit 114, a display control unit 115, an input interface unit 116, a network interface unit 117, and an output interface unit 118. The CPU 111, the memory 112, the first disk interface unit 113, the second disk interface unit 114, the display control unit 115, the input interface unit 116, the network interface unit 117, and the output interface unit 118 are connected to one another via a system bus. The auxiliary storage apparatus 12 is connected to the first disk interface unit 113. The disk drive 13 is connected to the second disk interface unit 114. The display apparatus 14 is connected to the display control unit 115. The keyboard 15 and the mouse 16 are connected to the input interface unit 116. The network 3 is connected to the network interface unit 117. The printer 20 is connected to the output interface unit 118 via the communication line. The auxiliary storage apparatus 12 is a magnetic disk drive or the like. To the disk drive 13, a computer-readable recording medium such as a CD-ROM 40 is inserted. To the disk drive 13, not only the CD-ROM 40 but also a CD-R/RW or the like can be inserted as described later. The display apparatus 14 is a liquid crystal display or the like. The display apparatus 14 is used for displaying information desired by an operator. The keyboard 15 and the mouse 16 are used to enter an instruction to the printing control apparatus 10 by an operator.

In the auxiliary storage apparatus 12, a program 30 for the printing control process in the embodiment (hereinafter, called "printing control program") is stored. The CPU 111 controls the entire printing control apparatus 10. The CPU 111 realizes various functions of the printing control apparatus 10 by executing the printing control program 30 stored in the auxiliary storage apparatus 12, in the memory 112. The memory 112 includes an Random Access Memory (RAM) and an Read Only Memory (ROM). The memory 112 functions as a work area in which the CPU 111 executes the printing control program 30 stored in the auxiliary storage apparatus 12. The printing control program 30 is provided by, for example, being stored in the CD-ROM 40 or the like. That is, the user purchases the CD-ROM 40 or the like as a recording medium of the printing control program 30, inserts it into the disk drive 13, reads the printing control program 30 from the CD-ROM 40, and installs the program into the auxiliary storage apparatus 12. Alternatively, the printing control program 30 transmitted via the network 3 can be received and installed into the auxiliary storage apparatus 12.

Figure 3:
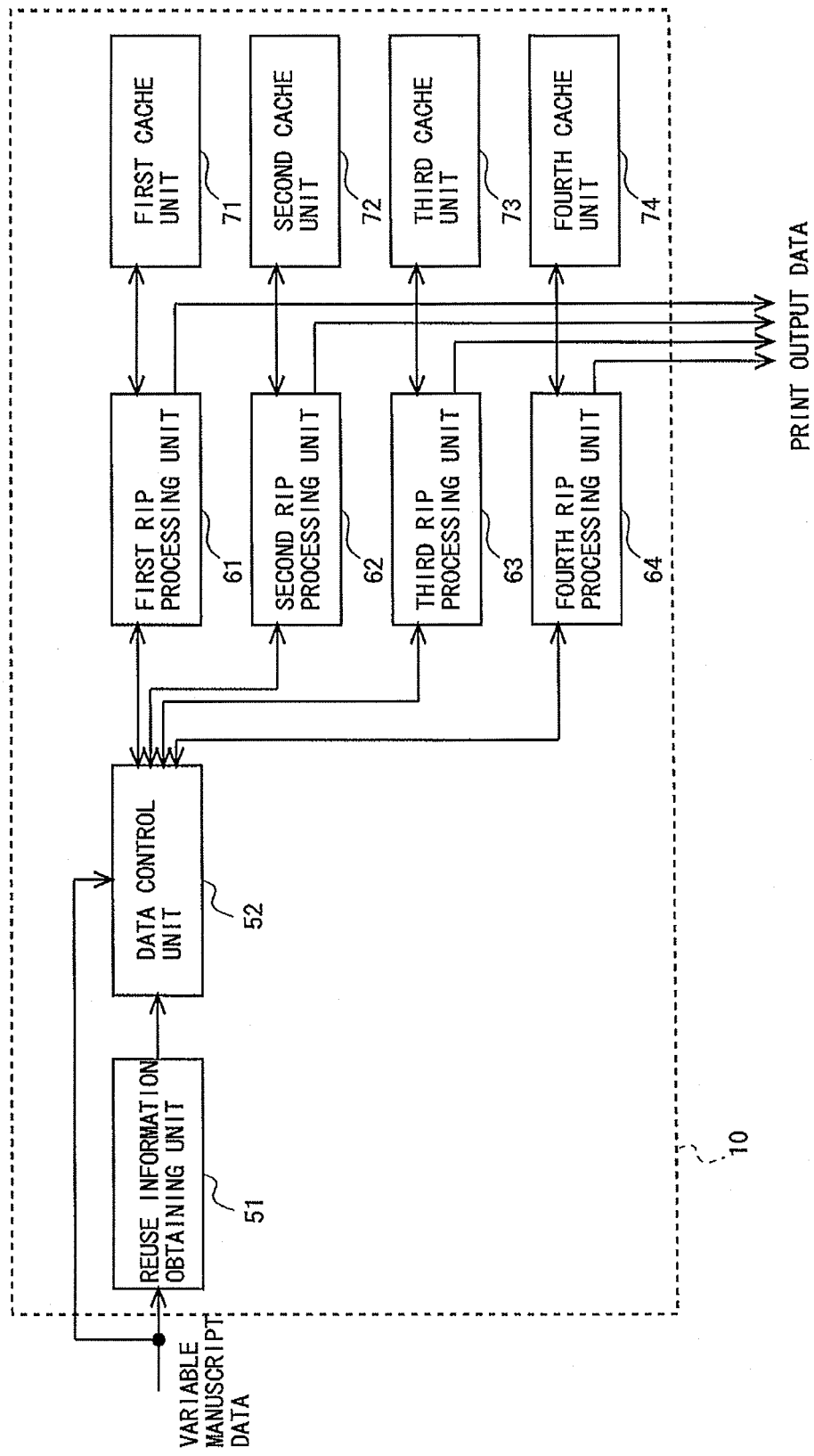
FIG. 3 is a block diagram illustrating a functional configuration of a main part of the printing control apparatus in the embodiment.

FIG. 3 is a block diagram illustrating a functional configuration of a main part of the printing control apparatus 10 in the embodiment. As illustrated in FIG. 3, the printing control apparatus 10 has a reuse information obtaining unit 51, a data control unit 52, first to fourth RIP processing units 61 to 64 as a plurality of output processing units, and first to fourth cache units 71 to 74 as first storage units. The reuse information obtaining unit 51, the data control unit 52, the first to fourth RIP processing units 61 to 64, and the first to fourth cache units 71 to 74 are realized as a result of executing the printing control program 30 by the CPU 111 in the memory 112. In the embodiment, a parallel RIP process is executed using the first to fourth RIP processing units 61 to 64. The first to fourth cache units 71 to 74 correspond to the first to fourth RIP processing units 61 to 64, respectively. Each cache unit is realized when a part of the storage region of the memory 112 is assigned to an RIP processing unit corresponding to the cache unit. In the embodiment, the configuration that the printing control apparatus 10 has four RIP processing units (first to fourth RIP processing units 61 to 64) will be described. It is, however, sufficient that the number of RIP processing units is plural (similarly, it is sufficient that the number of cache units is plural).

The variable manuscript data includes two kinds of parts. One of the parts is a part whose content varies among records (hereinafter, called a "variable part"). The other part is a part which is used a plurality of times in variable manuscript data, that is, reused (hereinafter, called a "reuse part").

The reuse information obtaining unit 51 obtains information related to reuse of parts (hereinafter, called "reuse information") from variable manuscript data. The reuse part information includes, for example, the number of reuse times of each part. From the number of reuse times of each part, reuse parts in the variable manuscript data are known and variable parts in the variable manuscript data are also known. Detection of a reuse part may be performed together with known preflight check. The reuse information obtaining unit 51 transmits the obtained reuse information to the data control unit 52.

The data control unit 52 assigns variable manuscript data to each of the RIP processing units. For example, the data control unit 52 transmits the variable manuscript data page by page in order of a first RIP processing unit 61, a second RIP processing unit 62, a third RIP processing unit 63, a fourth RIP processing unit 64, the first RIP processing unit 61, . . . . Hereinafter, variable manuscript data of one page will be described as "page data". In the case where a reuse part is used in page data to be transmitted, the data control unit 52 transmits information indicative of the reuse part in the received reuse information together with the page data. The data control unit 52 controls transmission of printing output data from each of the RIP processing units to the printer 20. That is, the data control unit 52 functions as an output control unit.

Each of the RIP processing units performs the RIP process on each of parts in received page data to generate RIP-processed data obtained by performing the RIP process on data indicative of a variable part (hereinafter, called "variable part data") in the page data (hereinafter, called "RIP-processed variable part data") and to generate RIP-processed data obtained by performing the RIP process on data indicative of a reuse part (hereinafter, called "reuse part data") in the page data (hereinafter, called "RIP-processed reuse part data"). In the embodiment, the RIP-processed data corresponds to output data. The RIP-processed reuse part data corresponds to a reuse part in output data.

To RIP-processed reuse part data, an RIP processing unit assigns an identifier unique to the RIP-processed reuse part data based on received reuse information. The data form of an identifier is not limited and various forms such as a serial number and 16-bit data can be employed. Assignment of an identifier to RIP-processed reuse part data may be performed by the data control unit 52 based on reuse information.

An RIP processing unit obtains synthesis information to be used for synthesizing RIP-processed data in the printer 20 from received page data. Alternatively, the data control unit 52 may obtain synthesis information from variable manuscript data.

An RIP processing unit caches RIP-processed variable part data, RIP-processed reuse part data, and an identifier corresponding to the RIP-processed reuse part data into a corresponding cache unit. Hereinafter, various RIP-processed data and/or identifiers cached in the cache unit will be collectively called "cache data". Each RIP processing unit may cache synthesis information in a corresponding cache unit.

An RIP processing unit reads cache data from a cache unit in accordance with control of the data control unit 52 and transmits synthesis information and RIP-processed data included in the cache data as printing output data to the printer 20. The RIP-processed data and the synthesis information may be transmitted at different timings to the printer 20. In the case where the data control unit 52 obtains synthesis information from variable manuscript data, the synthesis information may be transmitted from the data control unit 52 to the printer 20. Synthesis information can be transmitted to the printer 20 in various transmitting methods.

In the embodiment, in the case where a variable part is used, RIP-processed variable part data corresponding to the variable part is certainly transmitted. On the other hand, in the case where a reuse part is used, RIP-processed reuse part data corresponding to the reuse part is transmitted only when variable manuscript data is used for the first time in all of pages, and is not transmitted when the data is used for the second time and subsequent times. The details of the process of transmitting RIP-processed data in printing output data will be described later.

<3. Configuration of Printer>

Figure 4:
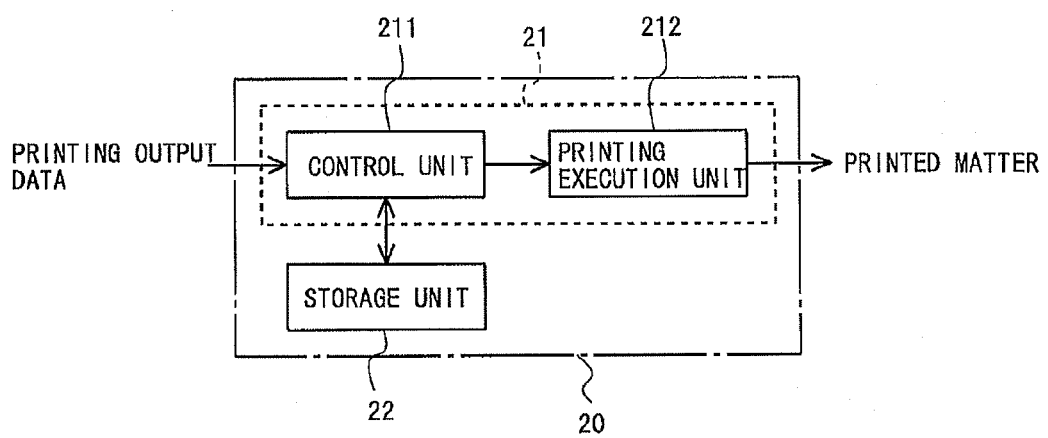
FIG. 4 is a block diagram illustrating a functional configuration of a main part of a printer in the embodiment.

FIG. 4 is a block diagram illustrating a functional configuration of a main part of the printer 20 in the embodiment. As illustrated in FIG. 4, the printer 20 has a printing unit 21 and a storage unit 22 as a second storage unit. The printing unit 21 includes a control unit 211 and a printing execution unit 212.

The configuration of such a printer 20 is disclosed in, for example, Japanese Patent Application Laid-Open Publication No. 2002-287934.

The control unit 211 receives printing output data and stores it into the storage unit 22. It is sufficient to store at least RIP-processed data in the storage unit 22, and synthesis information may not be stored. The control unit 211 reads synthesis information and RIP-processed data necessary for synthesis from the storage unit 22 and transmits them to the printing execution unit 212. The printing execution unit 212 synthesizes RIP-processed data based on the synthesis information and outputs a printed matter of one page. In the case where the number of kinds of RIP-processed data is only one, without performing synthesis of RIP-processed data, a printed matter is output.

<4. Cache Process>

Figure 5:
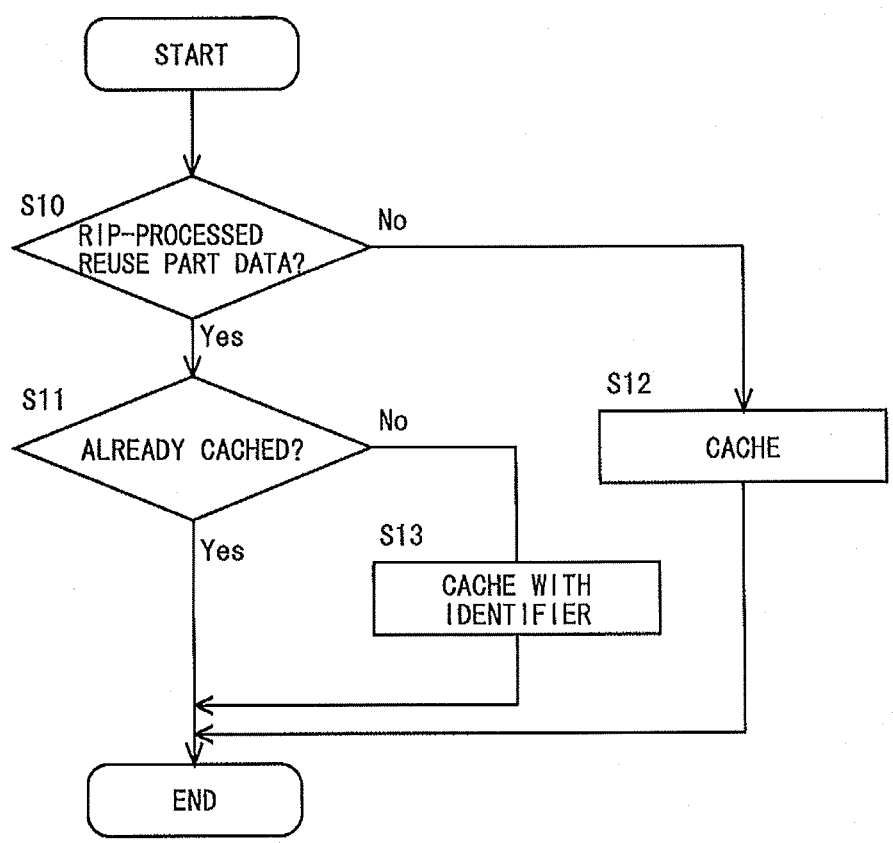
FIG. 5 is a flowchart illustrating an example of the procedure of cache process of RIP-processed data and identifiers in the embodiment.

FIG. 5 is a flowchart illustrating an example of the procedure of cache process of RIP-processed data and identifiers in the embodiment. The cache process shown in FIG. 5 is performed by an RIP processing unit. As will be described later, a part of the cache process may be performed by the data control unit 52. The cache process may be performed on the page unit basis or every RIP-processed data.

First, whether RIP-processed data obtained by the RIP process is RIP-processed reuse part data or not is determined (step S10). In the case where the RIP-processed data obtained by the RIP process is RIP-processed reuse part data, the program advances to step S11. In the case where the RIP-processed data obtained by the RIP process is not RIP-processed reuse part data, that is, is RIP-processed variable part data, the RIP-processed variable part data is cached in a corresponding cache unit (step S12). After step S12, the cache process is finished.

In step S11, whether the RIP-processed reuse part data is already cached in a corresponding cache unit or not is determined. In the case where the RIP-processed reuse part data is already cached, caching of the RIP-processed reuse part data is not performed, and the cache process is finished. In the case where the RIP-processed reuse part data is not cached yet, the RIP-processed reuse part data is cached together with a corresponding identifier (step S13). After step S13, the cache process is finished. Whether RIP-processed reuse part data is cached or not may be determined by an RIP processing unit or the data control unit 52. The determination is made, for example, based on an identifier corresponding to RIP-processed reuse part data.

Figure 6:
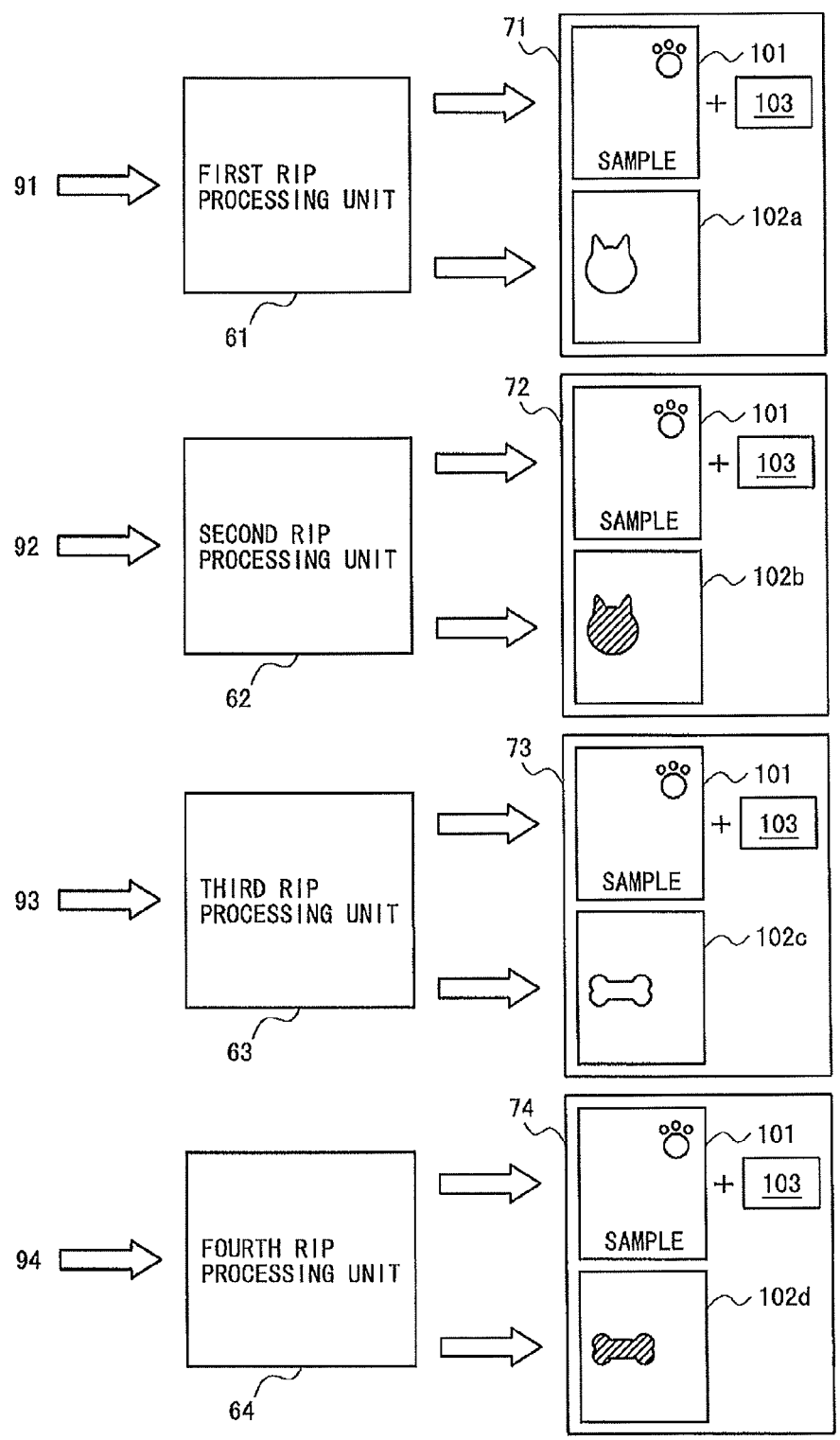
FIG. 6 is a diagram for explaining the cache process of RIP-processed data and identifiers in the embodiment.

FIG. 6 is a diagram for explaining the cache process of RIP-processed data and identifiers in the embodiment. In the example illustrated in FIG. 6, it is assumed that one reuse part and one variable part are used in each page, and caching of RIP-processed reuse part data to each of cache units is the first time.

The first RIP processing unit 61 receives first page data 91 and performs the RIP process on it, thereby generating RIP-processed reuse part data 101 and first RIP-processed variable part data 102a. The first RIP processing unit 61 caches the RIP-processed reuse part data 101, the first RIP-processed variable part data 102a, and an identifier 103 corresponding to the RIP-processed reuse part data 101 in the first cache unit 71.

The second RIP processing unit 62 receives second page data 92 and performs the RIP process on it, thereby generating the RIP-processed reuse part data 101 and second RIP-processed variable part data 102b. The second RIP processing unit 62 caches the RIP-processed reuse part data 101, the second RIP-processed variable part data 102b, and the identifier 103 corresponding to the RIP-processed reuse part data 101 in the second cache unit 72.

The third RIP processing unit 63 receives third page data 93 and performs the RIP process on it, thereby generating the RIP-processed reuse part data 101 and third RIP-processed variable part data 102c. The third RIP processing unit 63 caches the RIP-processed reuse part data 101, the third RIP-processed variable part data 102c, and the identifier 103 corresponding to the RIP-processed reuse part data 101 in the third cache unit 73.

The fourth RIP processing unit 64 receives fourth page data 94 and performs the RIP process on it, thereby generating the RIP-processed reuse part data 101 and fourth RIP-processed variable part data 102d. The fourth RIP processing unit 64 caches the RIP-processed reuse part data 101, the fourth RIP-processed variable part data 102d, and the identifier 103 corresponding to the RIP-processed reuse part data 101 in the fourth cache unit 74.

<5. RIP-Processed Data Transmitting Process>

Figure 7:
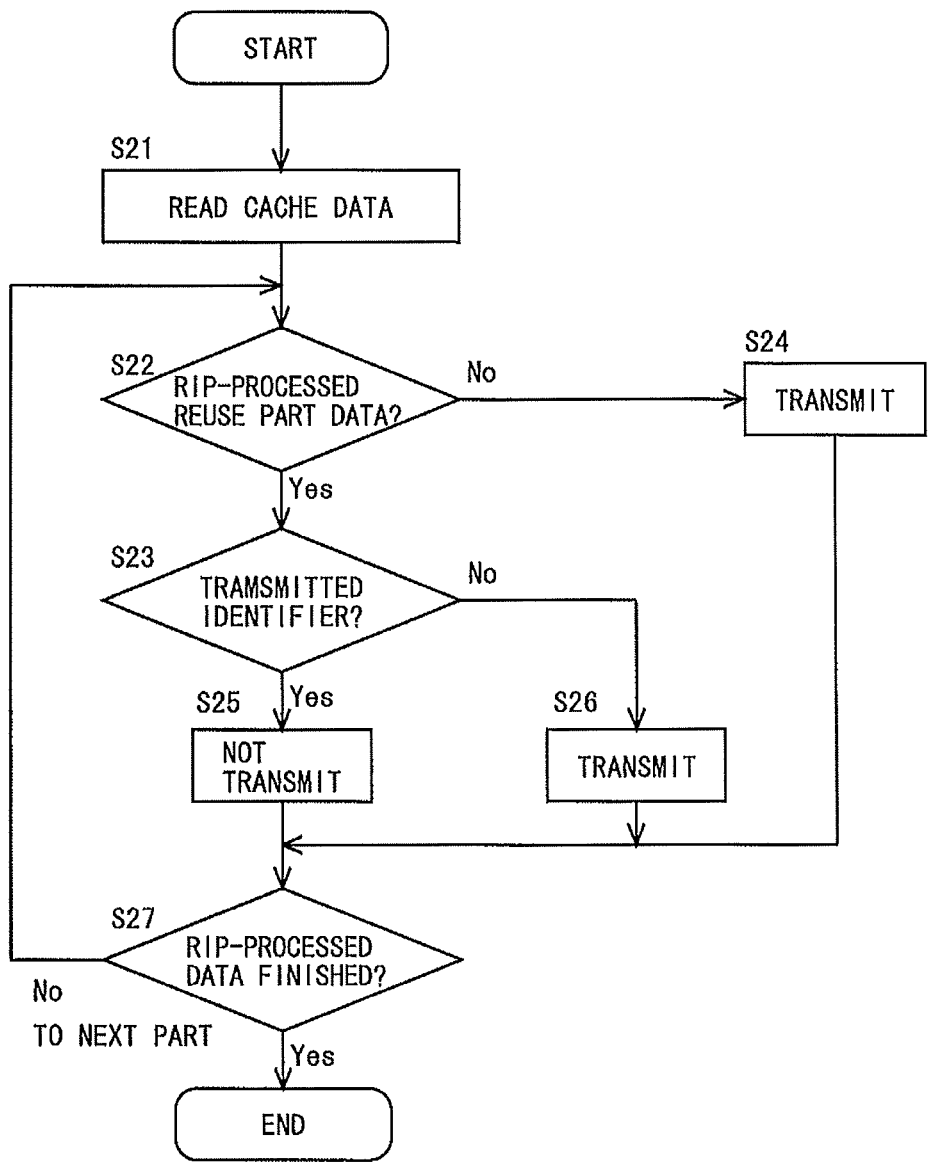
FIG. 7 is a flowchart illustrating an example of the procedure of process of transmitting RIP-processed data in the embodiment.

FIG. 7 is a flowchart illustrating an example of the procedure of process of transmitting RIP-processed data in the embodiment. Since a method of transmitting synthesis information in printing output data is not limited as described above, it is not described here. The procedure of process of transmitting RIP-processed data shown in FIG. 7 is performed in each RIP processing unit. First, cache data is read and transmitted to an RIP processing unit (step S21). The cache data read here corresponds to page data of one page.

Next, in the RIP processing unit, the read cache data is analyzed. Concretely, whether the RIP-processed data is RIP-processed reuse part data or not is determined (step S22). The determination is performed, for example, based on the presence/absence of an identifier. In the case where the RIP-processed data is RIP-processed reuse part data, the program advances to step S23. In the case where the RIP-processed data is not RIP-processed reuse part data, that is, is RIP-processed variable part data, the RIP-processed variable part data is transmitted to the printer 20 (step S24). After step S24, the program advances to step S27.

In step S23, a determination is made as to whether or not an identifier corresponding to RIP-processed reuse part data is the same as the identifier corresponding to the RIP-processed reuse part data, which is already transmitted to the printer 20 (hereinafter, called "transmitted identifier"). Hereinafter, determination of whether an identifier is a transmitted identifier or not in step S23 will be described as "identifier determination". In the case where an identifier corresponding to RIP-processed reuse part data is a transmitted identifier, the RIP-processed reuse part data is not transmitted to the printer 20 (step S25). In the case where an identifier corresponding to RIP-processed reuse part data is not a transmitted identifier, the RIP-processed reuse part data is transmitted to the printer 20 (step S26). After steps S25 and S26, the program advances to step S27.

In step S27, whether analysis on all of the RIP-processed data in the cache data is finished or not is determined. In the case where it is finished, the RIP-processed data transmitting process is finished. In the case where it is not finished, the program returns to step S22.

The identifier determination is performed by, for example, the data control unit 52 or an RIP processing unit. First, the case where the identifier determination is performed by the data control unit 52 will be described. In the case where cache data read from a corresponding cache unit includes an identifier, an RIP processing unit transmits the identifier to the data control unit 52. The data control unit 52 performs the identifier determination by determining whether or not the received identifier is the same as the transmitted identifier, in other words, the identifier already received from the first to fourth RIP processing units 61 to 64. The data control unit 52 can store an identifier received from an RIP processing unit to, for example, a predetermined storage table or the like. By referring to an identifier received in the past using such a storage table, the data control unit 52 can determine whether the received identifier is the same as that already received from the first to fourth RIP processing units 61 to 64 or not. The method of determining whether a received identifier is the same as that already received from the first to fourth RIP processing units 61 to 64 or not is not limited to the example described above, but various other methods can be employed. In the case where the received identifier is a transmitted identifier, the data control unit 52 does not give an instruction to transmit RIP-processed reuse part data corresponding to the identifier to the printer 20, or gives an instruction not to transmit RIP-processed reuse part data corresponding to the identifier to the printer 20, to the RIP processing unit as the transmitter. In the case where the received identifier is not a transmitted identifier, the data control unit 52 instructs an RIP processing unit as the transmitter to transmit RIP-processed reuse part data corresponding to the identifier to the printer 20.

Next, the case where the identifier determination is performed by an RIP processing unit will be described. In the case where cache data read from a corresponding cache unit includes an identifier, an RIP processing unit performs the identifier determination by determining whether or not the identifier is the same as the transmitted identifier, in other words, the identifier already read by any of the first to fourth RIP processing units 61 to 64. Each of the RIP processing units has, for example, a predetermined storage table and can store an identifier which is read from a corresponding cache unit into the storage table. The first to fourth RIP processing units 61 to 64 can mutually refer to identifiers which were read in the past by using the storage tables. By referring to the storage tables in the first to fourth RIP processing units 61 to 64, each of the RIP processing units can determine whether an identifier read from a corresponding cache unit is the same as that already read by any of the first to fourth RIP processing units 61 to 64 or not. The method of determining whether an identifier read from a corresponding cache unit is the same as that already read by any of the first to fourth RIP processing units 61 to 64 or not is not limited to the example described above, but various other methods can be employed.

Although description has been given on assumption that an actor performing the identifier determination is the data control unit 52 or an RIP processing unit, the present invention is not limited to the case. It is sufficient that the identifier determination can be performed in the printing control apparatus 10.

Figure 8:
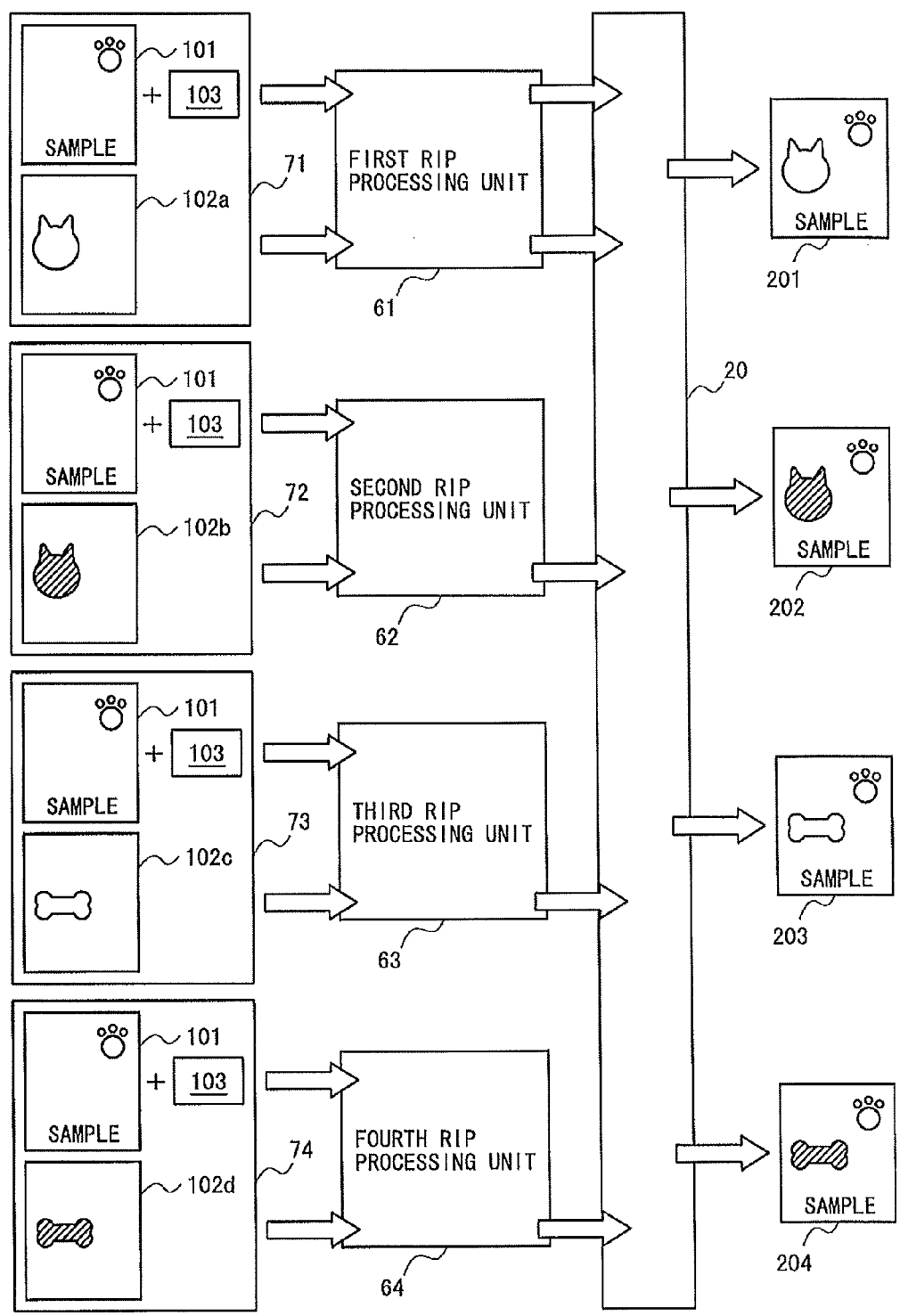
FIG. 8 is a diagram for explaining the process of transmitting RIP-processed data in the embodiment.

FIG. 8 is a diagram for explaining the process of transmitting RIP-processed data in the embodiment. In the embodiment, the process of transmitting RIP-processed data is performed in order of the first RIP processing unit 61, the second RIP processing unit 62, the third RIP processing unit 63, the fourth RIP processing unit 64, the first RIP processing unit 61, . . . . As illustrated in FIG. 8, in each cache unit, cache data similar to that in the example shown in FIG. 6 is cached. In description of FIG. 8, it is assumed that the identifier determination is performed by the data control unit 52.

At a timing when RIP-processed data corresponding to a printed matter 201 of the first page is to be transmitted, the first RIP processing unit 61 reads the RIP-processed reuse part data 101, the identifier 103 corresponding to the data 101, and the first RIP-processed variable part data 102a cached in the first cache unit 71. The first RIP processing unit 61 transmits the read identifier 103 to the data control unit 52. It is assumed that the number of times that the data control unit 52 receives the identifier 103 from any of the first to fourth RIP processing units 61 to 64 is one at this time. That is, the identifier 103 read by the first RIP processing unit 61 is not a transmitted identifier. Consequently, the data control unit 52 instructs the first RIP processing unit 61 to transmit the RIP-processed reuse part data 101 to the printer 20. The first RIP processing unit 61 transmits the first RIP-processed variable part data 102a to the printer 20 automatically without an instruction of the data control unit 52 or simultaneously with the RIP-processed reuse part data 101. In such a manner, the first RIP processing unit 61 transmits, as RIP-processed data, both of the RIP-processed reuse part data 101 and the first RIP-processed variable part data 102a to the printer 20.

At a timing when RIP-processed data corresponding to a printed matter 202 of the second page is to be transmitted, the second RIP processing unit 62 reads the RIP-processed reuse part data 101, the identifier 103 corresponding to the data 101, and the second RIP-processed variable part data 102b cached in the second cache unit 72. The second RIP processing unit 62 transmits the read identifier 103 to the data control unit 52. At this time, the identifier 103 has already been transmitted from the first RIP processing unit 61 to the data control unit 52. Consequently, the number of times that the data control unit 52 receives the identifier 103 from any of the first to fourth RIP processing units 61 to 64 is the second time. That is, the identifier 103 read by the second RIP processing unit 62 is a transmitted identifier. Therefore, the data control unit 52 does not give an instruction to transmit the RIP-processed reuse part data 101 to the printer 20 or gives an instruction not to transmit the RIP-processed reuse part data 101 to the printer 20, to the second RIP processing unit 62. The second RIP processing unit 62 transmits the second RIP-processed variable part data 102b to the printer 20 automatically without an instruction of the data control unit 52 or by an instruction of the data control unit 52. In such a manner, the second RIP processing unit 62 transmits, as RIP-processed data, only the second RIP-processed variable part data 102b to the printer 20. In a manner similar to the second RIP processing unit 62, the third and fourth RIP processing units 63 and 64 transmit third and fourth RIP-processed variable part data 102c and 102d to the printer 20.

<6. Printed Matter Generating Process>

Figure 9:
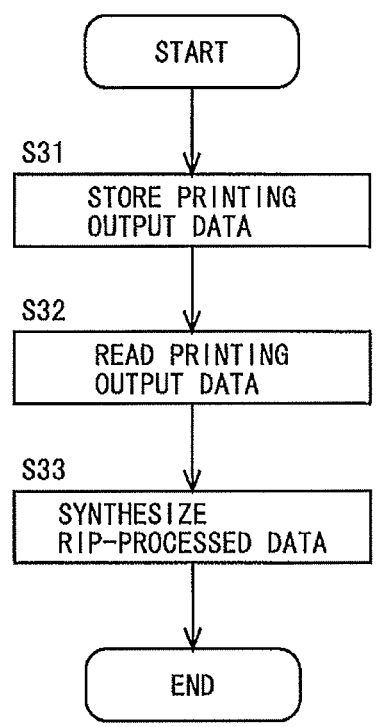
FIG. 9 is a flowchart illustrating an example of the procedure of printed matter generating process in the embodiment.

FIG. 9 is a flowchart illustrating an example of the procedure of processes for generating a printed matter (hereinafter, called "printed matter generating process") in the printer 20 in the embodiment. First, printing output data corresponding to a printed matter of each page received by the control unit 211 is stored in the storage unit 22 (step S31). Therefore, even if the RIP-processed reuse part data is transmitted only once as described above, the RIP-processed reuse part data can be used in each page at the time of synthesizing the RIP-processed data.

Next, by the control unit 211, synthesis information and RIP-processed data necessary for synthesis is read from the storage unit 22 (step S32). The RIP-processed data necessary for synthesis is determined by synthesis information. The synthesis information and the read RIP-processed data are transmitted to the printing execution unit 212.

By the printing execution unit 212, the RIP-processed data is synthesized based on the synthesis information, and a printed matter of one page expressing the synthesis state of the RIP-processed data is output (step S33).

In the example shown in FIG. 8, the control unit 211 receives, as printing output data corresponding to the printed matter 201 of the first page, the synthesis information of the first page, the RIP-processed reuse part data 101, and the first RIP-processed variable part data 102a, and stores them to the storage unit 22. After that, the control unit 211 reads the synthesis information of the first page, the RIP-processed reuse part data 101 and the first RIP-processed variable part data 102a necessary for synthesis from the storage unit 22, and transmits them to the printing execution unit 212. The printing execution unit 212 synthesizes the RIP-processed reuse part data 101 and the first RIP-processed variable part data 102a based on the synthesis information of the first page, and outputs the printed matter 201 of the first page expressing a state where the data is synthesized.

The control unit 211 receives, as printing output data corresponding to the printed matter 202 of the second page, the synthesis information of the second page and the second RIP-processed variable part data 102b, and stores them to the storage unit 22. The printing output data does not include the RIP-processed reuse part data 101. After that, the control unit 211 reads the synthesis information of the second page, the RIP-processed reuse part data 101 and the second RIP-processed variable part data 102b necessary for synthesis from the storage unit 22, and transmits them to the printing execution unit 212. The printing execution unit 212 synthesizes the RIP-processed reuse part data 101 and the second RIP-processed variable part data 102b based on the synthesis information of the second page, and outputs the printed matter 202 of the second page expressing a state where the data is synthesized. Printed matters 203 and 204 of the third and fourth pages are output by a procedure similar to that of the printed matter 202 of the second page.

<7. Advantages>

According to the embodiment, in the printing control apparatus which caches RIP-processed data, an identifier corresponding to RIP-processed reuse part data is cached. Since identifier determination using the identifier is performed, RIP-processed reuse part data of the same kind is transmitted to the printer 20 only at the time of use for the first time. Consequently, the speed of the printing output data transmitting process becomes higher than that of the conventional case. The speed of the entire printing process can be made higher than that of the conventional case.

In the embodiment, a parallel RIP process is performed. As compared with the case of performing the RIP process using one RIP processing unit, the speed of the RIP process can be increased. Accordingly, the speed of the entire printing process can be further increased.

In the embodiment, RIP-processed data is cached in a cache unit. Consequently, in the case where RIP-processed data has to be retransmitted to the printer 20 such as a case where, for example, deficiency, disappearance, or the like of RIP-processed data occurs in the printer 20, it is sufficient to retransmit RIP-processed data cached in a cache unit. It is unnecessary to perform the RIP process again. Thus, the speed of the entire printing process in the case where retransmission of RIP-processed data is necessary can be increased.

<8. First Modification>

Figure 10:
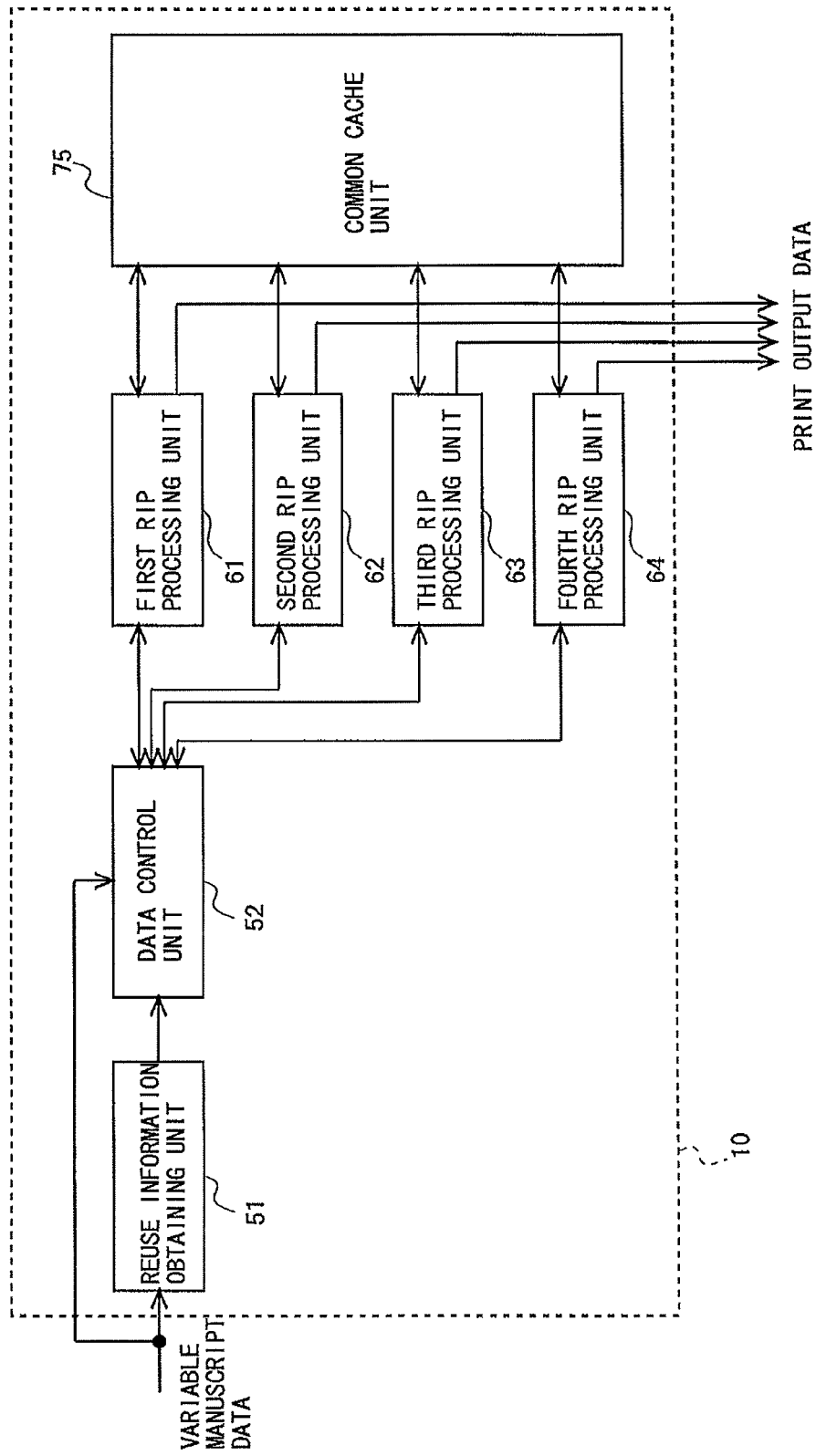
FIG. 10 is a block diagram illustrating a functional configuration of a main part of a printing control apparatus in a first modification of the embodiment.

FIG. 10 is a block diagram illustrating a functional configuration of a main part of the printing control apparatus 10 in a first modification of the embodiment. In the modification, as illustrated in FIG. 10, a common cache unit 75 which is commonly used for the first to fourth RIP processing units 61 to 64 is provided in place of the first to fourth cache units 71 to 74. The common cache unit 75 is realized by assigning a part of the storage region of the memory 112 commonly to the first to fourth RIP processing units 61 to 64.

Figure 11:
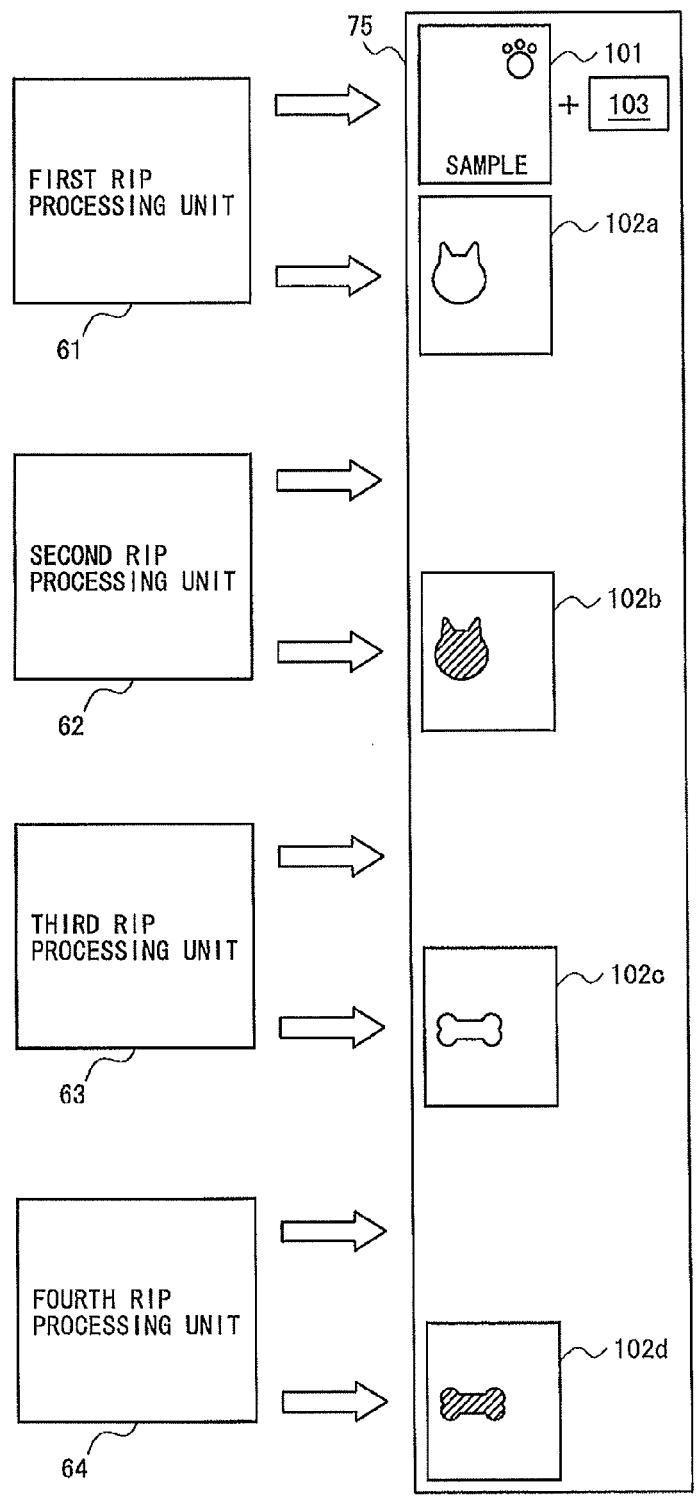
FIG. 11 is a diagram for explaining the cache process of RIP-processed data and identifiers in the first modification.

FIG. 11 is a diagram for explaining the cache process of RIP-processed data and identifiers in the modification. In the modification, the first to fourth RIP processing units 61 to 64 use the common cache unit 75 for caching, so that it is sufficient to cache RIP-processed reuse part data of one kind and an identifier corresponding to the data once by any of the first to fourth RIP processing units 61 to 64. For example, as illustrated in FIG. 11, it is sufficient that only the first RIP processing unit 61 caches the RIP-processed reuse part data 101 and the identifier 103 corresponding to the data in the common cache unit 75, and the second to fourth RIP processing units 62 to 64 do not have to perform similar caching. Consequently, as compared with the foregoing embodiment, the efficiency of the cache process can be increased.

<9. Second Modification>

Figure 12:
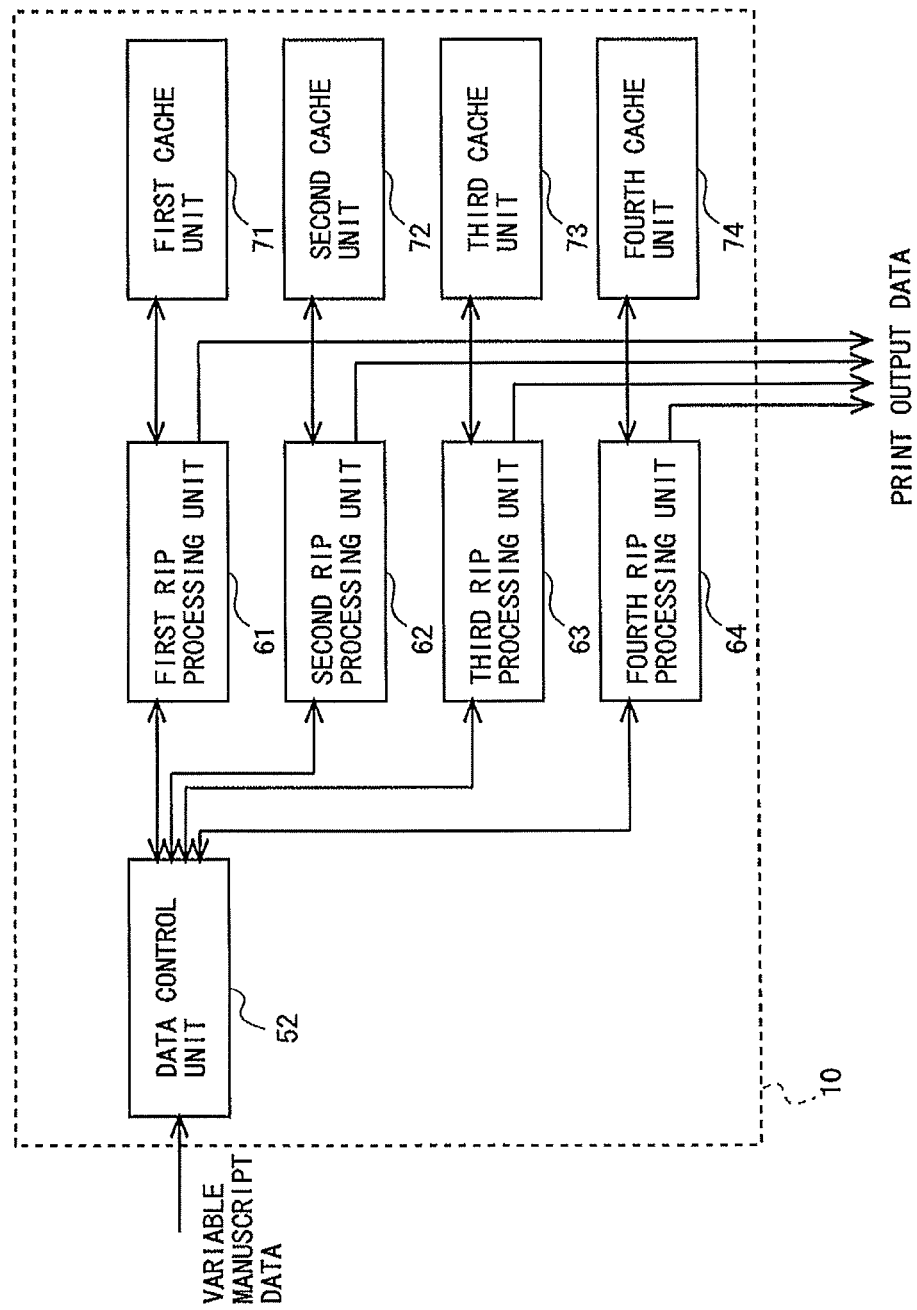
FIG. 12 is a block diagram illustrating a functional configuration of a main part of a printing control apparatus in a second modification of the embodiment.

FIG. 12 is a block diagram illustrating a functional configuration of a main part of the printing control apparatus 10 in a second modification of the embodiment. In the modification, as illustrated in FIG. 12, the reuse information obtaining unit 51 is not provided. On the other hand, variable manuscript data in the modification preliminarily includes reuse information in the embodiment. In the modification, by using reuse information included in variable manuscript data, an advantage similar to that of the embodiment can be obtained.

<10. Third Modification>

Figure 13:
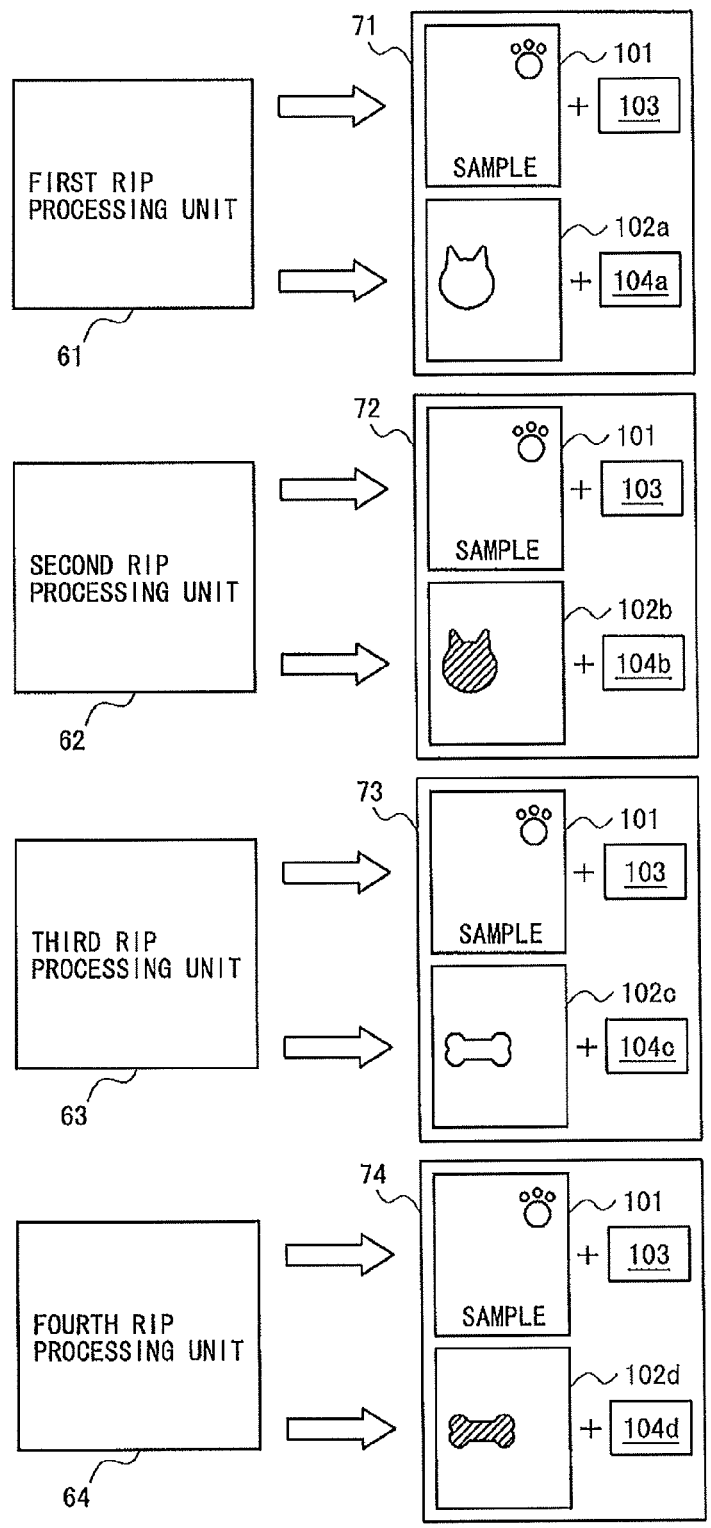
FIG. 13 is a diagram for explaining a cache process of RIP-processed data and identifiers in a third modification of the embodiment.

FIG. 13 is a diagram for explaining a cache process of RIP-processed data and identifiers in a third modification of the embodiment. In the modification, as illustrated in FIG. 13, a unique identifier is assigned to not only RIP-processed reuse part data but also RIP-processed variable part data. An identifier assigning method is similar to that of the foregoing embodiment.

The first RIP processing unit 61 also caches an identifier 104a (hereinafter, called "first variable identifier") corresponding to the first RIP-processed variable part data 102a into the first cache unit 71. The second RIP processing unit 62 also caches an identifier 104b (hereinafter, called "second variable identifier") corresponding to the second RIP-processed variable part data 102b into the second cache unit 72. The third RIP processing unit 63 also caches an identifier 104c (hereinafter, called "third variable identifier") corresponding to the third RIP-processed variable part data 102c into the third cache unit 73. The fourth RIP processing unit 64 also caches an identifier 104d (hereinafter, called "fourth variable identifier") corresponding to the fourth RIP-processed variable part data 102d into the fourth cache unit 74.

Figure 14:
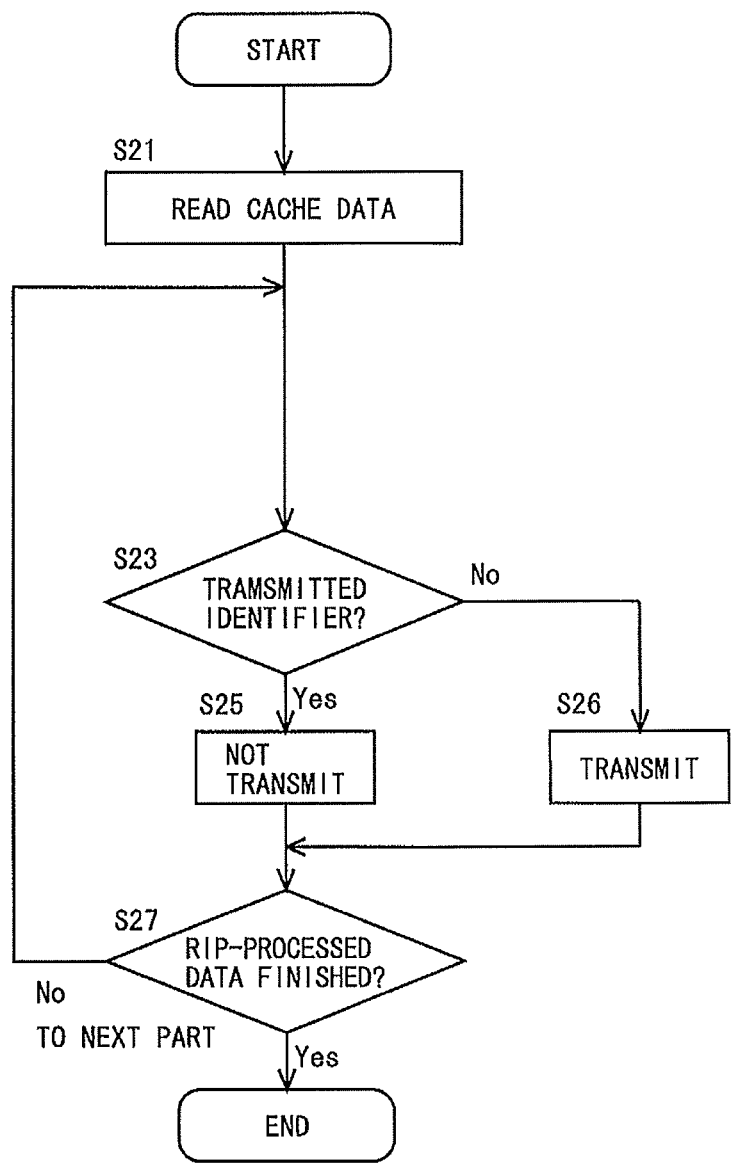
FIG. 14 is a flowchart illustrating an example of the procedure of cache process of RIP-processed data and identifiers in the third modification.
Figure 15:
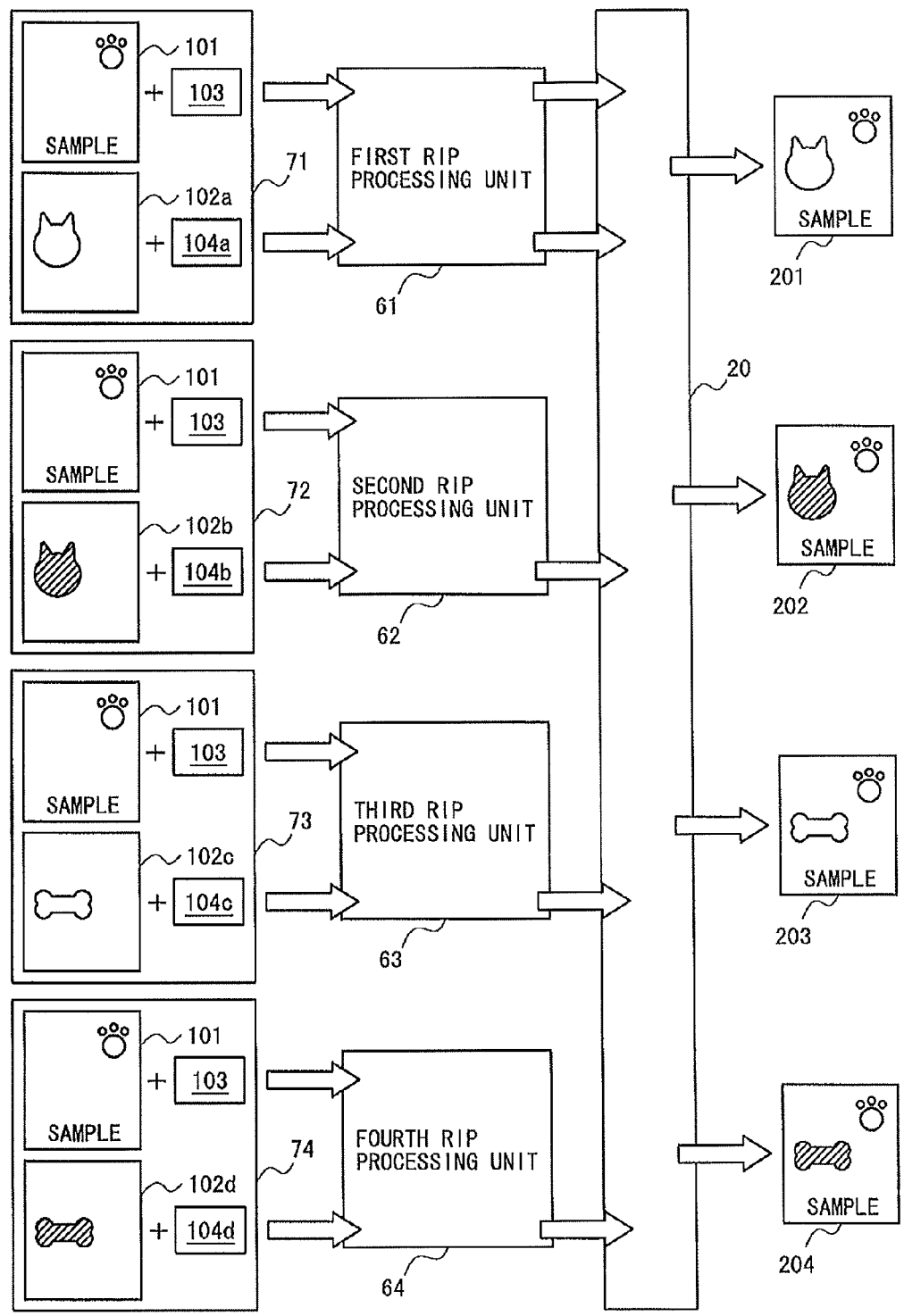
FIG. 15 is a diagram for explaining a process of transmitting RIP-processed data in the third modification.

FIG. 14 is a flowchart illustrating an example of the procedure of cache process of RIP-processed data and identifiers in the modification. In the modification, as illustrated in FIG. 14, step S22 of determining whether RIP-processed data is RIP-processed reuse part data or not and step S24 of transmitting RIP-processed data to the printer 20 in the case where the RIP-processed data is RIP-processed variable part data are not provided. Since none of identifiers corresponding to RIP-processed variable part data in the modification are transmitted identifiers, all of the identifiers are always transmitted to the printer 20 in a manner similar to the embodiment (steps S23 and S26). FIG. 15 is a diagram for explaining a process of transmitting RIP-processed data in the modification. In the modification, as illustrated in FIG. 15, since none of the first to fourth variable identifiers 104a to 104d are transmitted identifiers, they are transmitted to the printer 20.

In the modification, in a mode of assigning an identifier without discriminating RIP-processed reuse part data and RIP-processed variable part data, an advantage similar to that of the foregoing embodiment can be obtained.

<11. Others>

Although it has been described that the first to fourth cache units 71 to 74 are realized by the memory 112 in the embodiment and the common cache unit 75 is realized by the memory 112 in the first modification of the embodiment, the invention is not limited to the configurations. The first to fourth cache units 71 to 74 and the common cache unit 75 may be realized by the auxiliary storage apparatus 12 or the like.

Although it has been described that the parallel RIP process is performed in the foregoing embodiment and the modifications, the invention is not limited to the parallel RIP process. An RIP process may be performed by using one RIP processing unit. In this case, only one cache unit is provided. Also in such a mode, the speed of the printing output data transmitting process can be increased more than the conventional case.

Although variable printing has been described as an example in the foregoing embodiment and the modifications, the invention is not limited to the variable printing. The present invention is not limited to the variable printing but can be applied to any printing in which RIP-processed data is transmitted part by part from a printing control apparatus to a printer and a part of the same kind is used a plurality of times. The present invention has been described specifically above and the above description is illustrative in all of aspects and is not restrictive. It is to be understood that a number of other changes or modifications are possible without departing from the scope of the present invention.

From the above, the present invention can provide the printing control apparatus, the printing system, the recording medium having recorded thereon the printing control program, and the printing control method realizing higher speed of the entire printing process.

This application claims priority based on Japanese Patent Application No. 2012-75808 filed on Mar. 29, 2012, and entitled "Printing control apparatus, Printing System, Printing Control Program, and Printing Control Method", which is incorporated herein by reference in its entirety.

What is claimed is:

1. A printing control apparatus for obtaining output data in a print output form from manuscript data expressed in a page description language and made up of a plurality of pages, and transmitting the output data to an external printer, the apparatus comprising:
a plurality of output processing units for converting the manuscript data assigned to the output data and transmitting the output data to the printer; and
a first storage unit for storing at least a reuse part obtained by converting reuse part data indicative of a part reused in the manuscript data and an identifier corresponding to the reuse part, in the output data,
wherein the output processing units read a reuse part to be transmitted to the printer and an identifier corresponding to the reuse part from the first storage unit, and are configured to mutually refer to identifiers read from the first storage unit, and
wherein each output processing unit determines whether or not the identifier read from the first storage unit is an identifier corresponding to a reuse part already transmitted to the printer, and omits transmission of a reuse part corresponding to the same identifier as that corresponding to the reuse part already transmitted to the printer.

2. The printing control apparatus according to claim 1, further comprising a reuse information obtaining unit for obtaining information regarding reuse of a part in the manuscript data.

3. The printing control apparatus according to claim 1, wherein the manuscript data includes information regarding reuse of a part in the manuscript data.

4. The printing control apparatus according to claim 2, wherein each of the output processing units assigns the identifier to the reuse part based on the information regarding reuse of a part in the manuscript data.

5. The printing control apparatus according to claim 1, wherein the first storage unit also stores a part of the output data, the part being obtained by converting part data indicative of a part used only once in the manuscript data.

6. A printing system, comprising:
a printing control apparatus according to claim 1; and
a printer.

7. The printing system according to claim 6, wherein the printer includes:
a second storage unit for storing output data received from each of output processing units; and
a printing unit for reading the output data stored in the second storage unit and executing printing.

8. The printing system according to claim 7, wherein the printing control apparatus transmits synthesis information regarding synthesis of each of parts of the output data in each page to the printing unit, and
the printing unit synthesizes the parts of the output data stored in the second storage unit page by page based on the received synthesis information.

9. A non-transitory computer-readable recording medium having recorded thereon a printing control program, when executed using a memory by a CPU of a computer for obtaining output data in a print output form from manuscript data expressed in a page description language and made up of a plurality of pages and transmitting the output data to an external printer, causing the CPU to perform:
a plurality of output processing steps of converting the manuscript data assigned to the output data and transmitting the output data to the printer; and
a storage step of storing at least a reuse part obtained by converting reuse part data indicative of a part reused in the manuscript data and an identifier corresponding to the reuse part in the output data into a storage unit,
wherein in the output processing steps,
a reuse part to be transmitted to the printer and an identifier corresponding to the reuse part are read from the storage unit, and the output processing steps are configured to mutually refer to identifiers read from the storage unit, and
wherein in each output processing step,
whether or not the identifier read from the storage unit is an identifier corresponding to a reuse part already transmitted to the printer is determined, and
transmission of a reuse part corresponding to the same identifier as that corresponding to a reuse part already transmitted to the printer is omitted.

10. The non-transitory computer-readable recording medium according to claim 9, wherein the printing control program causes the CPU to further perform a reuse information obtaining step of obtaining information regarding reuse of a part in the manuscript data.

11. The non-transitory computer-readable recording medium according to claim 9, wherein the manuscript data includes information regarding reuse of a part in the manuscript data.

12. The non-transitory computer-readable recording medium according to claim 10, wherein in each of the output processing steps, the identifier is assigned to the reuse part based on information regarding reuse of a part in the manuscript data.

13. The non-transitory computer-readable recording medium according to claim 9, wherein in the storage step, a part of the output data is also stored, the part being obtained by converting part data indicative of a part that is used only once in the manuscript data.

14. A printing control method of obtaining output data in a print output form from manuscript data expressed in a page description language and made up of a plurality of pages and transmitting the output data to an external printer, the method comprising:

- a plurality of output processing steps of converting the manuscript data assigned to the output data and transmitting the output data to the printer; and
- a storage step of storing at least a reuse part obtained by converting reuse part data indicative of a part reused in the manuscript data and an identifier corresponding to the reuse part in the output data into a storage unit, wherein in the output processing steps,

- a reuse part to be transmitted to the printer and an identifier corresponding to the reuse part are read from the storage unit, and the output processing steps are configured to mutually refer to identifiers read from the storage unit and wherein in each output processing step,

- whether or not the identifier read from the storage unit is an identifier corresponding to a reuse part already transmitted to the printer is determined, and
- transmission of a reuse part corresponding to the same identifier as that corresponding to a reuse part already transmitted to the printer is omitted.

* * * * *